UNITED STATES PATENT OFFICE.

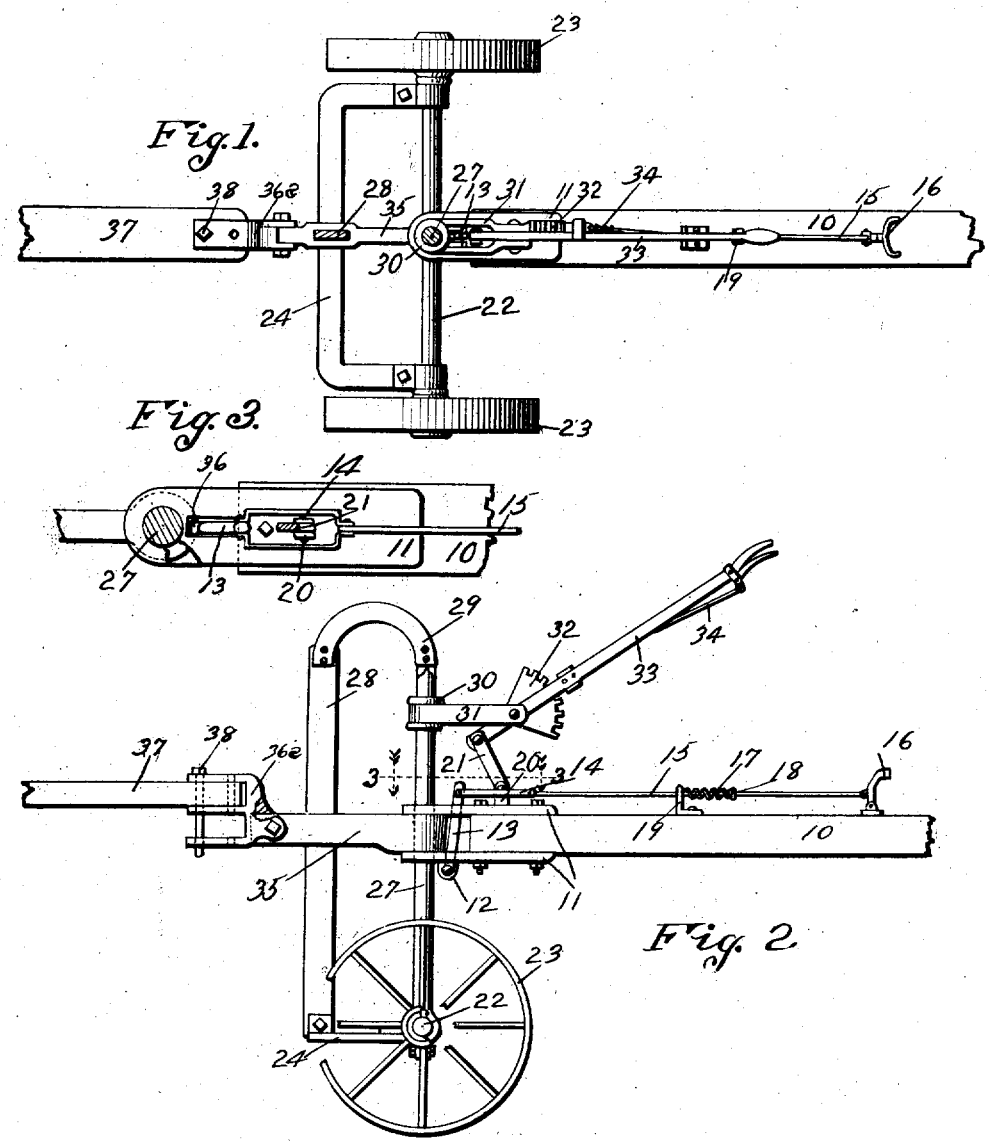

LUTHER A. BUCKLEY AND EVERITTE W. STEVENSON, OF MITCHELLVILLE, IOWA.

TONGUE-SUPPORT FOR DISK HARROWS.

No. 890,959.　　　　Specification of Letters Patent.　　　Patented June 16, 1908.

Application filed June 18, 1906. Serial No. 322,641.

*To all whom it may concern:*

Be it known that we, LUTHER A. BUCKLEY and EVERITTE W. STEVENSON, citizens of the United States, residing at Mitchellville, in the county of Polk and State of Iowa, have invented a certain new and useful Tongue-Support for Disk Harrows, of which the following is a specification.

In disk harrows and similar implements, there is at times very great downward pressure upon the forward end of the tongue and considerable side to side movement, which is very objectionable.

Our object is to provide a wheel support for the tongue designed to support the tongue in different positions of vertical adjustment so that it may be held at any angle desired; that will carry the tongue so that all downward pressure upon the draft animals is obviated; that will permit the draft animals to easily direct the implement from side to side or to turn around the corners in short space, and further, to provide means whereby the tongue may be held rigid so that the draft animals may readily move the implement backwardly.

A further object is to provide a device in the nature of an attachment that may be quickly and easily attached to the tongue of a farm implement or the like, and which is complete in itself, and is provided with means whereby the tongue to which it is attached may be raised or lowered, and the forward tongue section attached to it may also be raised or lowered, and in which there is a direct line of draft between the forward tongue section and the tongue of the implement.

Our invention consists in the construction, arrangement and combination of the various parts of the device, whereby the objects contemplated are attained, as hereinafter more fully set forth, pointed out in our claims and illustrated in the accompanying drawings, in which—

Figure 1 shows a plan view of the forward portion of the rear tongue section and the rear portion of the forward tongue section and our improved tongue supporting and adjusting device connected therewith. Fig. 2 shows a side elevation of the same, and Fig. 3 shows an enlarged detail, sectional view on the line 3—3 of Fig. 2.

Referring to the accompanying drawings, we have used the reference numeral 10 to indicate the rear tongue section which is preferably fixed firmly to a disk harrow or other implement. At its forward end are two plates 11 projecting beyond the rear tongue section and formed with vertical openings, for purposes hereinafter made clear. On the under plate is a lug 12 to which a lever 13 is pivoted, said lever being extended upwardly through slots in both plates in front of the forward end of the rear tongue section. A link 14 is attached to the top of the lever 13 and extended rearwardly. Pivoted to its rear end is a rod 15 connected with a foot lever 16 and on the rod is an extensible spring 17 to engage a collar 18 on the rod and a lug 19 on the rear tongue section and normally holding the foot treadle, the rod 15 and the lever 13 to their rearward limit. Said foot treadle is placed in such position as to be readily accessible to the driver so that it and the lever 13 may be pushed and held forwardly when desired. Fixed to the top plate 11 is a lug 20 to which a link 21 is attached, for purposes of raising and lowering the rear tongue section, as will hereinafter appear.

The wheel support comprises an axle 22 having the wheels 23 on its end and having a forwardly projecting frame 24 connected therewith. Fixed to the center of the axle is a round upright 27 and fixed to the center of the frame 24 is a flat upright 28 directly in front of the upright 27. The upper ends of the uprights 27 and 28 are connected by an arched cross piece 29. The upright 27 is passed through the openings in the plates 11. Mounted near the top of the upright 27 is a collar 30 having an arm 31 mounted thereon and projected rearwardly and also having a sector 32 fixed to said arm. A lever 33 is fulcrumed to the arm 31 and provided with a spring actuated pawl 34 to engage the sector and to hold the lever at different points of elevation. The lower forward end of said lever is pivoted to the link 21. By means of this lever the rear tongue section may be readily raised or lowered relative to the upright 27 and may be held at any point of elevation by the pawl.

Arranged between the plates 11 is a tongue connecting piece 35 having a vertical opening through which the upright 27 is passed and also having a notch 36 at its rear central portion to receive the lever 13 when said lever is at its forward limit. The spring 17 normally holds said lever in position out of said notch. Near the forward end of the connecting piece 35 is an angular opening through which the upright 28 is passed. Mounted on the forward end of the connecting piece 35 is a clevis 36ª having two vertical openings to receive pins and also having an upper pocket to receive the forward tongue section 37 and a lower pocket to receive a whiffle-tree. The forward tongue section and the whiffle-tree are pivotally connected to the clevis 36ª by means of the pin 38. If it is desired to rigidly support the forward tongue section in the clevis a pin is passed through the rear opening and through the rear of the forward tongue section.

In practical use and assuming the parts to be arranged, as shown in Fig. 2; and assuming further that said tongue section is rigidly secured to the clevis. Then all of the weight upon the forward end of the tongue will be carried by the wheel support and the tongue will be accurately held at the proper elevation. If the draft animals move from side to side, the upright 28 will be turned in the same direction as the forward tongue section and the wheel support will be steered in the proper path. If under varying conditions of the soil, the operator should desire to back the implement, he simply presses forwardly on the foot lever 16 and thus rigidly holds the front and rear sections of the tongue in line. In this way, all of the advantages of a rigid tongue or implements of this kind is secured and at the same time the weight is taken off of the draft animals and the operator may vertically adjust the tongue quickly and easily. If the pin is removed from the rear opening in the clevis 36ª, the forward tongue section is pivotally connected with the clevis and in this way all of the advantages of a tongueless implement of this kind may be secured.

One of the important features of our invention is that the device is complete in itself, and may be quickly and easily attached to or detached from any implement having a forward tongue section, and the means for supporting a forward tongue section in different positions of adjustment is carried wholly by our improved device, and therefore this device is not to be confused with the forward truck of a four wheeled implement in which means are provided for raising and lowering the body of the implement relative to the forward truck, which means are carried on the implement itself, and form no part of the truck.

Having thus described our invention, what we claim and desire to secure by Letters Patent of the United States, therefor is—

1. An attachment for supporting vehicle tongues, comprising a tongue receiving device designed to be detachably connected with the forward end of a vehicle tongue, a wheeled support, a rear upright and a front upright connected with the wheeled support, said rear upright having the tongue receiving device slidingly mounted thereon, a lever supported on the rear upright, means connected to the lever and to the tongue receiving device whereby the latter may be adjusted vertically upon the rear upright, a connecting piece having both of said uprights extended through it and slidingly connected with it, said connecting piece being pivotally connected with the tongue receiving device, and a tongue attached to the forward end of the connecting piece in front of the forward upright; said attachment being designed for connection with the tongue of a vehicle, and said lever being so arranged as to jointly adjust the vehicle tongue, the connecting piece, and the tongue of the attachment, whereby the vehicle tongue, the connecting piece, and the tongue of the attachment receive all of the draft to thereby relieve said uprights of any of the strain incident to bearing the draft.

2. The combination of a tongue section, supporting wheels, an upright thereon pivotally and slidingly connected with the tongue, a second upright in front of the first, a connecting piece having pivotal connection with the tongue section and slidingly mounted on both uprights, means for connecting draft animals with the forward end of the connecting piece, means for securing the tongue section in different positions of adjustment on the uprights and means for locking the connecting piece and tongue section in position in line with each other.

3. The combination of a rear tongue section, a support comprising an axle, wheels on the axle, an upright fixed to the axle and having the forward end of the tongue pivotally and slidingly connected with it, a frame extended forwardly from the axle, an angular upright thereon, means for connecting the upper ends of the uprights, a lever fulcrumed to the rear upright, a link connecting the lever with the tongue section, a piece connecting the uprights movable with one and slidably connected with both, and a forward tongue section attached to the front of the connecting piece.

4. The combination of a tongue section, a wheeled support for the forward end thereof, a connecting piece slidingly connected to the wheeled support and pivoted to the tongue section, means for connecting draft animals to its forward end and means for locking the connecting piece to the tongue section.

5. The combination of a tongue section, a wheeled support for the forward end thereof, a connecting piece slidingly connected to the wheeled support and pivoted to the tongue section, means for connecting draft animals to its forward end, said connecting piece formed with a notch at its rear end, a lever pivoted to the tongue section and capable of moving into the notch to lock said parts together, a spring for normally holding the spring out of the notch and a foot treadle for forcing the lever into the notch.

6. The combination of a rear tongue section, a wheeled support comprising an axle, wheels thereon, a forwardly projecting frame, an upright on the axle and an upright on the frame in front of the axle, a connecting piece pivotally connected with the rear tongue section and formed with a notch, said connecting piece and rear tongue section both slidingly mounted on the rear upright, a lever pivoted to the rear tongue section and capable of entering the notch to lock the parts against rotation, a spring for normally holding the lever away from the notch, a foot treadle for forcing the lever into the notch, an arm mounted on the rear upright, a lever fulcrumed thereto, a link connecting the lever with the rear tongue section, means for adjustably securing the lever in different positions, a clevis at the forward end of the connecting piece and a forward tongue section connected with the clevis.

7. A tongue-supporting attachment, comprising a rear upright, a forward upright fixed with respect to the rear upright, a wheeled support for said uprights, a device slidingly mounted upon and reaching rearwardly from the rear upright and adapted to be attached to the tongue of an apparatus to be drawn, a tongue-connector disposed in front of the forward upright, a connecting piece slidable, with the rearwardly-reaching device, on the rear upright and movable freely up and down with respect to the forward upright and engaged by said forward upright to prevent lateral movement independent of the same and connected solely by said engagement with the forward upright and constituting the sole connection between the rear and forward uprights, on the one hand, and the tongue-connector, on the other, and means carried by the attachment for adjustably fixing the connecting piece at various points in the height of the uprights.

Des Moines, Iowa, May 19, 1906.

LUTHER A. BUCKLEY.
EVERITTE W. STEVENSON.

Witnesses:
  C. L. HENNEY,
  F. BUTLER.